US010360203B2

(12) United States Patent
Bhatnagar et al.

(10) Patent No.: US 10,360,203 B2
(45) Date of Patent: Jul. 23, 2019

(54) SYSTEMS AND METHODS FOR GENERATING AND IMPLEMENTING DATABASE AUDIT FUNCTIONALITY ACROSS MULTIPLE PLATFORMS

(71) Applicant: McKesson Specialty Care Distribution Corporation, San Francisco, CA (US)

(72) Inventors: Ajay Bhatnagar, Holly Springs, NC (US); Asif Jiwani, Sugar Land, TX (US); Alan Stickler, The Woodlands, TX (US)

(73) Assignee: McKesson Specialty Care Distribution Corporation, San Francisco, CA (US)

( * ) Notice: Subject to any disclaimer, the term of this patent is extended or adjusted under 35 U.S.C. 154(b) by 0 days.

(21) Appl. No.: 14/230,233

(22) Filed: Mar. 31, 2014

(65) Prior Publication Data

US 2015/0278320 A1    Oct. 1, 2015

(51) Int. Cl.
*G06F 16/23* (2019.01)
*G06F 16/22* (2019.01)
(Continued)

(52) U.S. Cl.
CPC ........... *G06F 16/23* (2019.01); *G06F 16/21* (2019.01); *G06F 16/2228* (2019.01); *G06F 16/27* (2019.01)

(58) Field of Classification Search
CPC ......... G06F 17/30575; G06F 17/30321; G06F 16/27; G06F 16/2228; G06F 16/23
(Continued)

(56) References Cited

U.S. PATENT DOCUMENTS

| 5,628,530 A | 5/1997 | Thornton |
| 6,012,035 A | 1/2000 | Freeman et al. |

(Continued)

FOREIGN PATENT DOCUMENTS

| CA | 2482370 | 3/2006 |
| WO | 1995003569 | 2/1995 |

(Continued)

OTHER PUBLICATIONS

Sampson, R.J., Taking Control of Health Care Costs, Best's Review—Life Health Insurance Edition, Nov. 1983, vol. 84, Issue 7, USA; Abstract only.
(Continued)

*Primary Examiner* — Usmaan Saeed
*Assistant Examiner* — Brian E. Weinrich
(74) *Attorney, Agent, or Firm* — Ballard Spahr LLP

(57) ABSTRACT

Systems and methods are provided for generating and implementing data auditing functionality supporting multiple database platforms. A database management computer system can engage a shadow audit module to automate and optimize the implementation of data auditing functionality for multiple database platforms that may be utilized by an enterprise application to record data interactions (e.g., insertions, updates, deletions, etc). The shadow audit module may run generated audit SQL code to create an audit trigger in the selected main data tables. Each audit trigger may be a procedure and/or a flag that is stored in the main data table to run or transmit a signal indicating a change may have occurred on the record indicating the required replication of the modification in the shadow audit data table.

20 Claims, 5 Drawing Sheets

(51) Int. Cl.
  *G06F 16/27* (2019.01)
  *G06F 16/21* (2019.01)
  *G06F 15/16* (2006.01)
(58) Field of Classification Search
  USPC ........................................................ 707/610
  See application file for complete search history.

(56) References Cited

U.S. PATENT DOCUMENTS

| | | | |
|---|---|---|---|
| 6,195,612 B1 | 2/2001 | Pack-Harris | |
| 6,633,835 B1* | 10/2003 | Moran | H04L 47/10 |
| | | | 702/181 |
| 6,757,898 B1 | 6/2004 | Ilsen et al. | |
| 6,769,228 B1 | 8/2004 | Mahar | |
| 7,155,397 B2 | 12/2006 | Alexander et al. | |
| 7,401,027 B2 | 7/2008 | Moore et al. | |
| 7,418,431 B1 | 8/2008 | Mies | |
| 7,761,311 B2 | 7/2010 | Clements et al. | |
| 7,797,172 B2 | 9/2010 | Fitzgerald et al. | |
| 7,933,866 B2* | 4/2011 | Blair | G06F 17/30581 |
| | | | 707/610 |
| 8,244,556 B1 | 8/2012 | Ringold | |
| 8,332,349 B1* | 12/2012 | Wilson | G06F 17/30368 |
| | | | 707/607 |
| 8,489,411 B1 | 7/2013 | Rowe et al. | |
| 8,620,862 B2* | 12/2013 | Holenstein | G06F 11/2097 |
| | | | 707/610 |
| 8,682,697 B1 | 3/2014 | Harris | |
| 8,781,854 B1 | 7/2014 | Harris | |
| 2001/0037216 A1 | 11/2001 | Oscar et al. | |
| 2002/0002495 A1 | 7/2002 | Ullman | |
| 2002/0087583 A1 | 7/2002 | Morgan et al. | |
| 2002/0111832 A1 | 8/2002 | Judge | |
| 2002/0111886 A1 | 8/2002 | Chenevich | |
| 2002/0188476 A1 | 12/2002 | Bienvenu | |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0069760 A1 | 4/2003 | Gelber | |
| 2003/0083903 A1 | 5/2003 | Myers | |
| 2003/0149625 A1 | 8/2003 | Leonardi et al. | |
| 2003/0154163 A1 | 8/2003 | Phillips et al. | |
| 2003/0182206 A1 | 9/2003 | Hendrix et al. | |
| 2003/0229540 A1 | 12/2003 | Algiene | |
| 2004/0006490 A1* | 1/2004 | Gingrich | G06F 19/328 |
| | | | 705/2 |
| 2004/0039599 A1 | 2/2004 | Fralic | |
| 2004/0054685 A1 | 3/2004 | Rahn | |
| 2004/0073457 A1 | 4/2004 | Kalies | |
| 2004/0078234 A1 | 4/2004 | Tallal, Jr. et al. | |
| 2004/0117323 A1 | 6/2004 | Mindala | |
| 2004/0148198 A1 | 7/2004 | Kalies | |
| 2004/0156490 A1 | 8/2004 | Adams | |
| 2004/0249745 A1 | 12/2004 | Baaren | |
| 2005/0015280 A1 | 1/2005 | Gabel et al. | |
| 2005/0060201 A1 | 3/2005 | Connely, III et al. | |
| 2005/0102169 A1 | 5/2005 | Wilson | |
| 2005/0114182 A1 | 5/2005 | Randoph et al. | |
| 2005/0137912 A1 | 6/2005 | Rao et al. | |
| 2005/0154627 A1 | 7/2005 | Zuzek et al. | |
| 2005/0187793 A1 | 8/2005 | Myles | |
| 2005/0197862 A1 | 9/2005 | Paterson et al. | |
| 2005/0240473 A1 | 10/2005 | Ayers, Jr. et al. | |
| 2005/0288972 A1 | 12/2005 | Marvin et al. | |
| 2006/0020514 A1 | 1/2006 | Yered | |
| 2006/0026041 A1 | 2/2006 | Ullman | |
| 2006/0036470 A1 | 2/2006 | Oaks | |
| 2006/0085230 A1 | 4/2006 | Brill et al. | |
| 2006/0149784 A1 | 7/2006 | Tholl et al. | |
| 2006/0173778 A1 | 8/2006 | Lipsky | |
| 2006/0184391 A1 | 8/2006 | Barre et al. | |
| 2006/0212318 A1 | 9/2006 | Dooley | |
| 2006/0217824 A1 | 9/2006 | Allmon et al. | |
| 2006/0259363 A1 | 11/2006 | Jhetam et al. | |
| 2007/0005402 A1 | 1/2007 | Kennedy et al. | |
| 2007/0050209 A1 | 3/2007 | Yered | |
| 2007/0118410 A1 | 5/2007 | Nadal | |
| 2007/0136100 A1 | 6/2007 | Daugherty et al. | |
| 2007/0203757 A1 | 8/2007 | Dibiasi et al. | |
| 2007/0219828 A1 | 9/2007 | Schlicher et al. | |
| 2007/0233525 A1 | 10/2007 | Boyle | |
| 2007/0233526 A1 | 10/2007 | Hoffman et al. | |
| 2007/0239493 A1 | 10/2007 | Sweetland et al. | |
| 2008/0097903 A1 | 4/2008 | Boyle | |
| 2009/0132289 A1 | 5/2009 | Stenman et al. | |
| 2009/0164496 A1* | 6/2009 | Carnathan | G06F 17/30368 |
| | | | 707/999.102 |
| 2009/0244600 A1 | 10/2009 | Haycock | |
| 2010/0005124 A1* | 1/2010 | Wagner | G06F 17/30575 |
| | | | 707/E17.005 |
| 2010/0015926 A1* | 1/2010 | Luff | H04L 41/0604 |
| | | | 455/67.13 |
| 2012/0185263 A1 | 7/2012 | Emert | |
| 2013/0212508 A1 | 8/2013 | Barsoum | |
| 2013/0262403 A1* | 10/2013 | Milousheff | G06F 17/30371 |
| | | | 707/691 |
| 2014/0229442 A1* | 8/2014 | Wankawala | G06F 17/30575 |
| | | | 707/639 |
| 2015/0051915 A1 | 2/2015 | Moore et al. | |
| 2015/0074069 A1* | 3/2015 | Baeuerle | G06F 17/30424 |
| | | | 707/702 |
| 2015/0278974 A1 | 10/2015 | Doerr et al. | |

FOREIGN PATENT DOCUMENTS

| | | |
|---|---|---|
| WO | 2000039737 | 7/2000 |
| WO | 2007025295 | 3/2007 |
| WO | 2010040075 | 4/2010 |

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-PRESCRIPTIONS, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, vol. 63, Issue 1, USA; Abstract only.

Anonymous, TechRx Announces Successful Beta Deployment of T-Rex. PR Newswire. May 13, 2002.

Navitus, "Pharmacy Adjudication Alternative to AWP" Pharmacy Benefits Academy Aug. 19, 2010.

Viewpoints, "AWP Litigation Means Rapid Change Ahead" Nov./Dec. 2008.

State of Mississippi, Division of Medicaid, Provider Policy Manual May 1, 2008.

Paduda, Joseph, "Managed Care Matters" from comments, 2006.

Pennsylvania Department of Aging, "Acquisition Cost-Based Pricing for the PACE Program" Feb. 20, 2009.

Laury, Susan K.; McInnes, Melayne Morgan; "The impace of insurance prices on decision making biases: An experimental analysis;" Jun. 2003; Journal of Risk & Insurance; vol. 70 No. 2; ISSN: 0022-4367.

Irvine, Benedict; "Health care superieur: Does the UK need French lessons;" May/Jun. 2001; Consumer Policy Review, vol. 11 No. 3; pp. 92-100; Journal Code: CPW.

Knight-Ridder Tribune Business News; "Milwaukee-Area Businesses Initiate Plan to Cut Health Costs;" Sep. 2, 2003; Supplier No. 107223132.

(56) References Cited

OTHER PUBLICATIONS

Non-Final Office Action for U.S. Appl. No. 11/759,767 dated Jul. 9, 2009.
Final Office Action for U.S. Appl. No. 11/759,767 dated Dec. 24, 2009.
Non-final Office Action for U.S. Appl. No. 12/415,134, dated Apr. 6, 2011.
Non-final Office Action for U.S. Appl. No. 12/327,100 dated May 11, 2011.
Non-final Office Action for U.S. Appl. No. 11/759,767 dated Jun. 24, 2011.
Final Office Action for U.S. Appl. No. 12/327,100 dated Oct. 17, 2011.
Final Office Action for U.S. Appl. No. 11/759,767 dated Dec. 6, 2011.
Non-final Office Action for U.S. Appl. No. 12/731,269 dated Jan. 13, 2012.
Final Office Action for U.S. Appl. No. 12/731,269 dated Jun. 19, 2012.
Non-final Office Action for U.S. Appl. No. 12/731,269 dated Oct. 19, 2012.
Final Office Action for U.S. Appl. No. 12/731,269 dated Mar. 15, 2013.
Notice of Allowance for U.S. Appl. No. 11/759,767 dated Apr. 25, 2013.
Non-Final Office Action for U.S. Appl. No. 12/731,269 dated Jun. 25, 2013.
Non-Final Office Action for U.S. Appl. No. 13/208,811 dated Oct. 4, 2013.
Notice of Allowance for U.S. Appl. No. 12/731,269 dated Oct. 23, 2013.
Notice of Allowance for U.S. Appl. No. 13/208,811 dated Mar. 21, 2014.
Non-final Office Action for U.S. Appl. No. 13/966,799 dated Jun. 29, 2015.
Final Office Action for U.S. Appl. No. 13/966,799 dated Dec. 17, 2015.
Non-Final Office Action for U.S. Appl. No. 13/966,799 dated Sep. 21, 2016, 26 pages.
Final Office Action for U.S. Appl. No. 14/230,369 dated Dec. 13, 2016, 33 pages.
Non-Final Office Action for U.S. Appl. No. 14/230,369 dated Jun. 30, 2016.

* cited by examiner

|  | Column 1 | Column 2 | Column 3 | ... | Column N | Audit Trigger Column |
|---|---|---|---|---|---|---|
| Row 1 | data | data | data | data | data | Trigger/Trigger flag 1 |
| Row 2 | data | data | data | data | data |  |
| Row 3 | data | data | data | data | data |  |
| ... | data | data | data | data | data |  |
| Row M | data | data | data | data | data | Trigger/Trigger flag 2 |

502A — Trigger/Trigger flag 1
502B — Trigger/Trigger flag 2
504 — Audit Trigger Column

FIG. 5

SYSTEMS AND METHODS FOR GENERATING AND IMPLEMENTING DATABASE AUDIT FUNCTIONALITY ACROSS MULTIPLE PLATFORMS

TECHNICAL FIELD

Aspects of the disclosure relate generally to database auditing and more particularly to systems and methods for generating and implementing database audit functionality across multiple database platforms.

BACKGROUND

Enterprise applications generally require auditing of data modifications in a database. Depending on the database platform being used, this is typically achieved by manual design and implementation of audit tables with corresponding triggers or equivalent software that intercepts data edits and populates the audit tables. The tools available for database audits today are limited to a specific application database and do not support multiple database platforms.

BRIEF DESCRIPTION OF THE DRAWINGS

Reference will now be made to the accompanying drawings, which are not necessarily drawn to scale, and wherein:

FIG. 5 is an illustration of an audit trigger in the main data table, according to one exemplary embodiment.

DETAILED DESCRIPTION OF EXEMPLARY EMBODIMENTS

Exemplary embodiments will now be described more fully hereinafter with reference to the accompanying drawings, in which exemplary embodiments are shown. The concepts disclosed herein may, however, be embodied in many different forms and should not be construed as limited to the exemplary embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Exemplary embodiments described herein include systems and methods for generating and implementing database auditing functionality supporting multiple database platforms. In one example, a database management computer system may engage a shadow audit module to automate and optimize the implementation of data auditing functionality for multiple database platforms utilized by an enterprise application to record data interactions (e.g., insertions, updates, deletions, etc). In one example, a shadow audit module may generate audit code, such as, for example, audit structured query language (SQL) code. The shadow audit module may utilize the audit code to generate a shadow audit data table that replicates all or a portion of a main data table of a database and populates corresponding metadata, which may, for example, indicate whether the data in the main data table has been deleted, inserted, updated, a user identification for the user associated with the deletion, insertion or update of the data, and/or the date/time of the data modifications. The shadow audit module may also utilize the audit code to generate one or more audit triggers. In one example, the one or more audit triggers may be a procedure, and/or a flag that is stored in the main data table to run or transmit a signal indicating a change may have occurred on the record indicating the required replication of the modification in the shadow audit data table. If the audit trigger runs, a replica of the change may be created in a corresponding one or more records in the shadow audit data table. In one example embodiment, the main data table may only store the current version of a given record, while the shadow audit data table may include a history of all data modifications that have been made to the corresponding main data table.

System Overview

Figure 1:
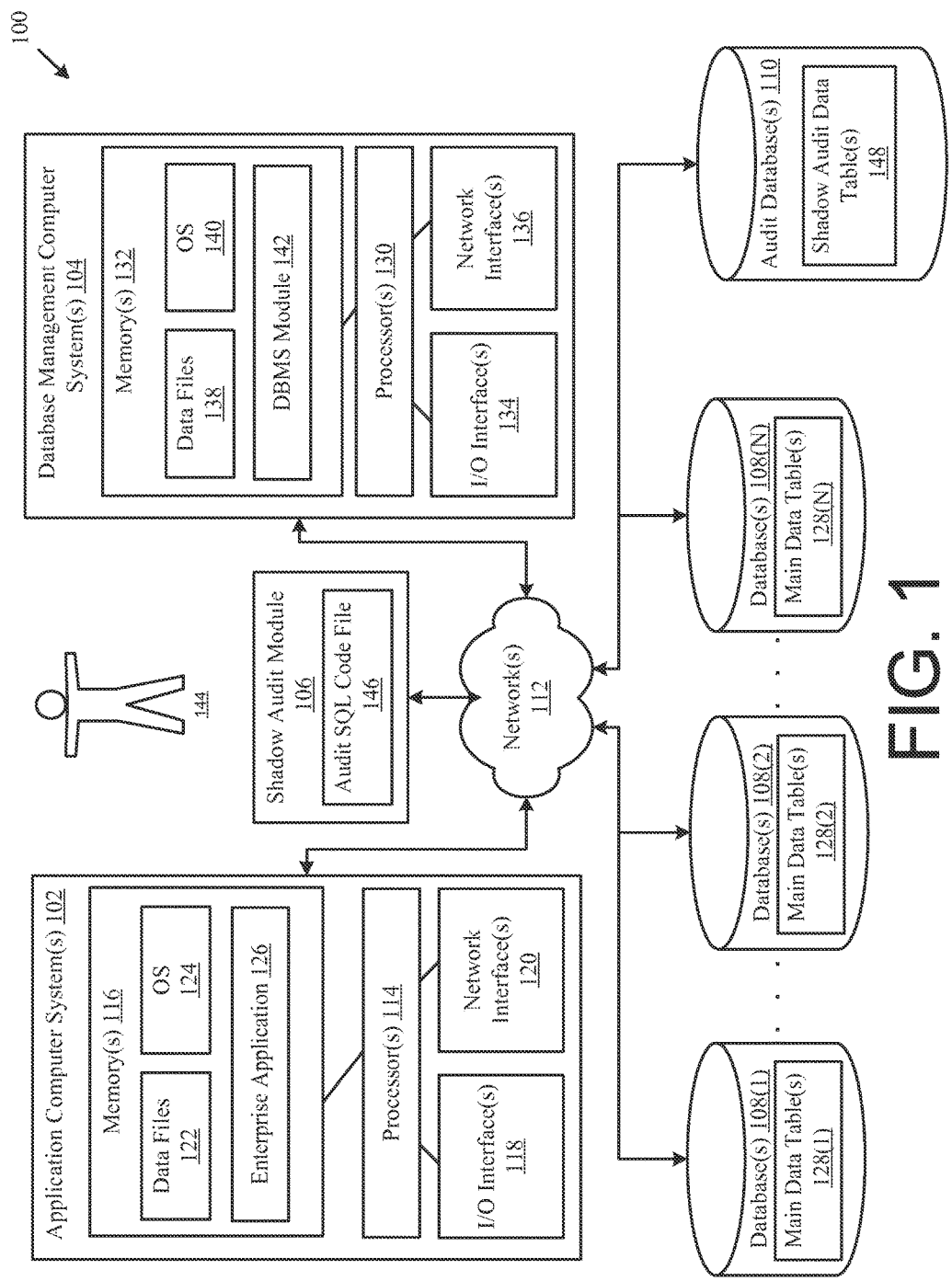
FIG. 1 illustrates an example system for facilitating, among other things, creating and implementing database auditing functionality across multiple database platforms, according to one exemplary embodiment.

FIG. 1 illustrates an example system 100 for facilitating, among other things, generating and implementing database auditing functionality supporting multiple database platforms. As shown in FIG. 1, the example system 100 may include one or more application computer systems 102, one or more database management computer systems 104, a shadow audit module 106, one or more databases 108(1)-(N), and/or one or more audit databases 110. As desired, each of the application computer systems 102 and/or the database management computer systems 104 may include one or more processing devices that may be configured for accessing and reading associated computer-readable media having stored data thereon and/or computer-executable instructions for implementing various embodiments of the disclosure.

Generally, network devices and systems, including the one or more application computer systems 102 and the one or more database management computer systems 104 may include or otherwise be associated with suitable hardware and/or software for transmitting and receiving data and/or computer-executable instructions over one or more communication links or networks. These network devices and systems may also include any number of processors for processing data and executing computer-executable instructions, as well as other internal and peripheral components currently known in the art or which may be developed in the future. Further, these network devices and systems may include or be in communication with any number of suitable memory devices operable to store data and/or computer-executable instructions. By executing computer-executable instructions, each of the network devices may form a special-purpose computer or particular machine. As used herein, the term "computer-readable medium" describes any medium for storing computer-executable instructions.

As shown in FIG. 1, the one or more application computer systems 102, the one or more database management computer systems 104, the one or more shadow audit module 106, the one or more databases 108(1)-(N), and/or the one or more audit databases 110 may be in communication with each other via a variety of networks. For example, without limitation, the one or more application computer systems 102, the one or more database management computer systems 104, the one or more shadow audit module 106, the one or more databases 108(1)-(N), and/or the one or more audit databases 110 may be in communication with each other via one or more networks, such as network 112, which may include one or more independent and/or shared private and/or public networks including the Internet or a publicly switched telephone network. In other example embodiments, one or more components of the system 100 may communicate via direct connections and/or communication links. Each of these components—the one or more application computer systems 102, the one or more database management computer systems 104, the shadow audit module 106, the one or more databases 108(1)-(N), the one or more audit databases 110 and the network 112—will now be discussed in further detail. Although the components are generally discussed as singular components, as may be implemented in various example embodiments, in alternative exemplary embodiments each component may include any number of suitable computers and/or other components.

With continued reference to FIG. 1, the one or more application computer systems 102 may be associated with (e.g., located within or providing computing services for) one or more entities (e.g., corporations), an individual, or any combination thereof. The application computer system 102 may be a computing device that includes any number of server computers, mainframe computers, networked computers, desktop computers, personal computers, mobile devices, smartphones, digital assistants, personal digital assistants, tablet devices, Internet appliances, application-specific integrated circuits, microcontrollers, minicomputers, and/or any other processor-based devices. In certain example embodiments, the operations and/or control of the application computer system 102 may be distributed among several processing components. For example, the functionality associated with the application computer system 102 may be performed by the one or more database management computer systems 104.

In addition to including one or more processors 114, the application computer system 102 may further include one or more memory devices (or memory) 116, one or more input/output ("I/O") interfaces 118, and one or more network interfaces 120. The memory devices 116 may be any suitable memory devices, for example, caches, read-only memory devices, random access memory devices, magnetic storage devices, removable storage devices, etc. The memory devices 116 may store data, executable instructions, and/or various program modules utilized by the application computer system 102, for example, data files 122, an operating system ("OS") 124, and an enterprise application 126. The OS 124 may be any suitable software module that controls the general operation of the application computer system 102. The OS 124 may be any operating system known in the art or which may be developed in the future including, but not limited to, Microsoft Windows®, Apple OSX™, Apple iOS™ Google Android™, Linux, UNIX, or a mainframe operating system.

The enterprise application 126 may include one or more enterprise applications such as, for example, enterprise resource planning systems (ERP), hospital management systems, pharmacy management systems, customer resource management systems (CRM), etc., to facilitate interaction (e.g., creating, updating, deleting) data files 122 and other data stored in the memory device 116 and/or one or more databases 108(1)-(N), including one or more main data tables 128(1)-(N). In one example, the database 108(1) may correspond to the enterprise application 126. For example, if the enterprise application 126 is an application capable of utilizing Microsoft SQL Server®, the database 108(1) may be a SQL Server® database. Alternatively, the database 108(1) may be a different database platform, for example, an Oracle® database. The one or more enterprise applications may, for example, be designed and deployed by the application computer system 102. Alternatively, the application may be a part of a software-as-a-service (SaaS) and/or a web based application. In yet another example, the enterprise application may be a part of an on-demand service, where services, such as an enterprise application 126, may be delivered to the application computing system 102 through the Internet.

The one or more I/O interfaces 118 may facilitate communication between the application computer system 102 and one or more input/output devices, for example, one or more user interface devices, such as a display, keypad, control panel, mouse, touch screen display, remote control, microphone, etc., that facilitate user interaction with the application computer system 102. The one or more network interfaces 120 may facilitate connection of the application computer systems 102 to one or more suitable networks, for example, the network 112, the Internet, the intranet, and/or a one or more corporate networks. In this regard, the application computer system 102 may receive and/or communicate information to other network components of the system 100, such as the database management computer system 104.

With continued reference to FIG. 1, the one or more database management computer systems 104 may be associated with (e.g., located within or providing computing services for) one or more entities (e.g., corporations, businesses, government entities, non-profits, etc.), an individual, or any combination thereof. The database management computer system 104 may be a computing device that includes any number of server computers, mainframe computers, networked computers, desktop computers, personal computers, mobile devices, smartphones, digital assistants, personal digital assistants, tablet devices, Internet appliances, application-specific integrated circuits, microcontrollers, minicomputers, and/or any other processor-based devices. In certain example embodiments, the operations and/or control of the database management computer system 104 may be distributed among several processing components. For example, the functionality associated with the one or more database management computer systems 104 may be performed by the one or more application computer systems 102.

In addition to including one or more processors 130, the database management computer system 104 may further include one or more memory devices (or memory) 132, one or more input/output ("I/O") interfaces 134, and one or more network interfaces 136. The memory devices 132 may be any suitable memory devices, for example, caches, read-only memory devices, random access memory devices, magnetic storage devices, removable storage devices, etc. The memory devices 132 may store data, executable instructions, and/or various program modules utilized by the database management computer system 104, for example, data files 138, an operating system ("OS") 140, and a database management (DBMS) module 142.

The OS 140 may be any suitable software module that controls the general operation of the database management computer system 104. The OS 140 may be any operating system known in the art or which may be developed in the future including, but not limited to, Microsoft Windows®, Apple OSX™, Apple iOS™, Google Android™, Linux, UNIX, or a mainframe operating system. The DBMS module 142 may facilitate management of data files 122 and other data stored in the memory device 116, one or more databases 108(1)-(N), including one or more main data tables 128(1)-(N), and/or one or more audit databases 110. In one example, the database 108(1) may be a SQL Server® database. Alternatively, the database 108(1) may be a different database platform, for example, an Oracle® database. Additionally, the database(s) 108(2)-(N) may be different database platforms than that of database 108(1). For example, if database 108(1) is a SQL Server® database, database 108(2) may be an Oracle® database.

The one or more I/O interfaces 134 may facilitate communication between the database management computer system 104 and one or more input/output devices, for example, one or more user interface devices, such as a display, keypad, control panel, touch screen display, mouse, remote control, microphone, etc., that facilitate user interaction with the database management computer system 104. For example, the one or more I/O interfaces 134 may facilitate use of the database management computer system 104 by a user 144 (e.g., a database administrator, a program developer, an information technology (IT) professional, or the like). The one or more network interfaces 136 may facilitate connection of the database management computer system 104 to one or more suitable networks, for example, the network 112, the Internet, the intranet, and/or a one or more corporate networks. In this regard, the database management computer system 104 may receive and/or communicate information to other network components of the system 100, such as the application computer system 102 and/or the shadow audit module 106.

A shadow audit module 106 or a shadow audit application may also be operative with the database management computer system 104. The shadow audit module 106 may include computer-executable instructions operable for facilitating the generation and implementation of data auditing functionality supporting multiple database platforms. In one example, data auditing functionality may include a process of conducting a data audit of data within a database table to assess changes made to a database data table. In one example, auditing functionality facilitated by the shadow audit module 106 may generate an audit structured query language (SQL) code file 146. The audit SQL code file 146 may include, without limitation, audit SQL code which may be utilized to generate and/or update one or more shadow audit data tables 148 stored in the one or more audit databases 110. For example, the audit SQL code may be run against the one or more main data tables 128(1)-(N) to generate the one or more shadow audit data tables 148. The one or more shadow audit data tables 148 may include, without limitation, the current records included in the one or more main tables 128(1)-(N), historical records previously included in the one or more main data tables 128(1)-(N), and/or metadata corresponding to one or more data modifications made to the corresponding main data table. In one example, the metadata may indicate whether the data has been deleted, inserted, updated, a user identification for the user associated with the deletion, insertion or update of the data, and/or the date/time of the data modifications, etc. In certain example embodiments, the shadow audit data tables 148 may include an entire audit history, providing a user, access to all the changes that may have occurred in one or more main data tables.

The network 112 may include any telecommunication and/or data network, whether public, private, or a combination thereof, including a local area network, a wide area network, an intranet, the Internet, intermediate handheld data transfer devices, and/or any combination thereof and may be wired and/or wireless, or any combination thereof. The network 112 may also allow for real time, offline, and/or batch transactions to be transmitted between or among the one or more application computer systems 102, the one or more database management computer systems 104, the one or more shadow audit module 106, the one or more databases 108(1)-(N), and/or the one or more audit databases 110. Various methodologies as described herein, may be practiced in the context of distributed computing environments. Although the one or more database management computer systems 104 is shown for simplicity as being in communication with the one or more application computer systems 102 via one intervening network 112, it is to be understood that any other network configurations are possible. For example, intervening network 112 may include a plurality of networks, each with devices such as gateways and routers for providing connectivity between or among the components of the system 100. Instead of or in addition to the network 112, dedicated communication links may be used to connect various devices in accordance with an example embodiment. For example, the one or more database management computer systems 104 may form the basis of network 112 that interconnects the one or more application computer systems 102, the one or more database management computer systems 104, the one or more shadow audit module 106, the one or more databases 108(1)-(N), and/or the one or more audit databases 110.

Those of ordinary skill in the art will appreciate that the system 100 shown in and described with respect to FIG. 1 is provided by way of example only. Numerous other operating environments, system architectures, and device and network configurations are possible. Other system embodiments can include fewer or greater numbers of components and may incorporate some or all of the functionality described with respect to the system components shown in FIG. 1. For example, in an exemplary embodiment, the shadow audit module 106 (or a separate and distinct computer system) may be implemented as a specialized processing machine that includes hardware and/or software for performing the methods described herein. Accordingly, embodiments of the disclosure should not be construed as being limited to any particular operating environment, system architecture, or device or network configuration.

Operational Overview

Certain portions of the exemplary methods below will be described with reference to generating and implementing data auditing functionality supporting multiple database platforms. While the methods described below are described utilizing the shadow audit module with reference to a single application, this is for example only. It should be appreciated that the shadow audit module may generate and implement data audit functionality for multiple applications supporting multiple database platforms.

Figure 2:
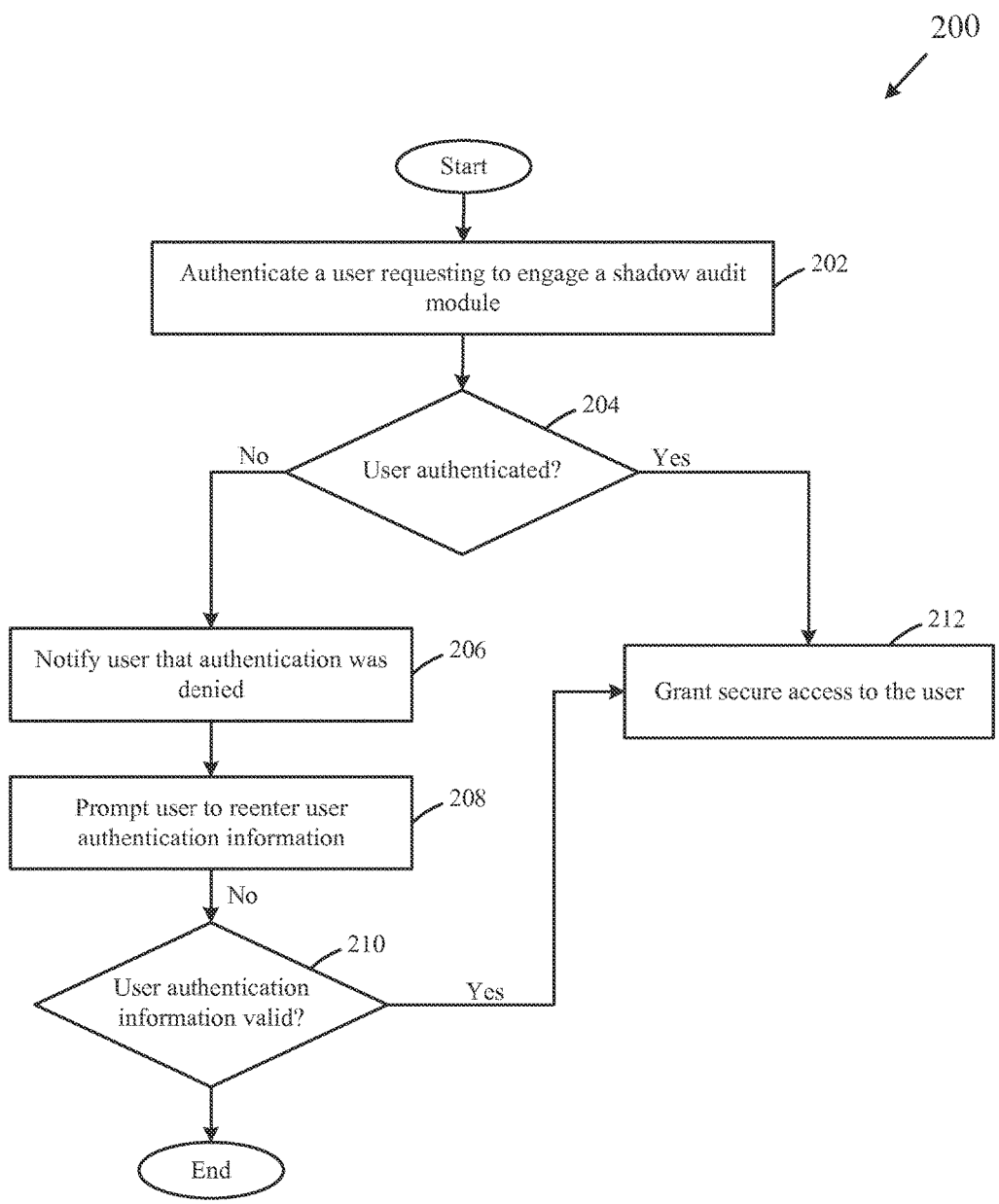
FIG. 2 illustrates a flow chart of an example method for authenticating a user to generate data auditing functionality for one or more databases associated with an application, according to an example embodiment.

FIG. 2 is a flow chart illustrating an example method 200 for authenticating a user to generate data auditing functionality for one or more databases associated with an application, according to an example embodiment of the disclosure. Referring now to FIGS. 1 and 2, the exemplary method 200 begins at the START step and continues to step 202, where a user, such as user 144 of the database management computer system 104 may request to engage a shadow audit module, such as the shadow audit module 106. In one example, the request may include a request to authenticate the user 144, prior to engaging/initiating the shadow audit module 106. For example, the user 144 may be prompted to input login credentials associated with the database management computer system 104 and/or the shadow audit module 106. For example, upon engaging/initiating the shadow audit module 106, the user 144 may be prompted to enter one or more login credentials and/or other authentication information (e.g., a username/password, digital certificates, encryption keys, fingerprints, retinal scan, etc.). In one example, the user 144 may be any user (e.g., a database administrator, a program developer, in IT professional, a system administrator, or the like) with both read and write permission.

At block 204, the database management computer system 104 determines whether the authentication information is valid. In one example, the DBMS module 142 of the database management computer system 104 may determine whether the authentication information is valid by comparing the authentication information to one or more corresponding user records stored in the data files 138. If the database management computer system 104 determines that the authentication information does not match user records existing in a user file, then the NO branch is followed and processing may proceed to block 206. However, if at block 204 the database management computer system 104 determines that the authentication information matches user records existing in a user file, then the YES branch is followed and processing may proceed to block 210.

At block 206, a notification of invalid user authentication information may be displayed to the user 144 at, for example, the I/O interface 134 and the user may be denied access. At block 208, the user 144 may be prompted by the database management computer system 104 at, for example, the I/O interface 134 to resubmit user authentication information. At block 210, the computing system 104 may determine whether the resubmitted user authentication information is valid. If at block 210, the user 144 resubmits valid user authentication information, the YES branch is followed and processing may proceed to block 212. If, however, at block 210 the user 144 fails to resubmit valid user authentication information, the NO branch is followed and the method 200 may proceed back to block 206 or optionally the method 200 may end. At block 212, the user 144 may be granted secure access by the database management computer system 104 and the method may proceed to FIG. 3.

Figure 3:
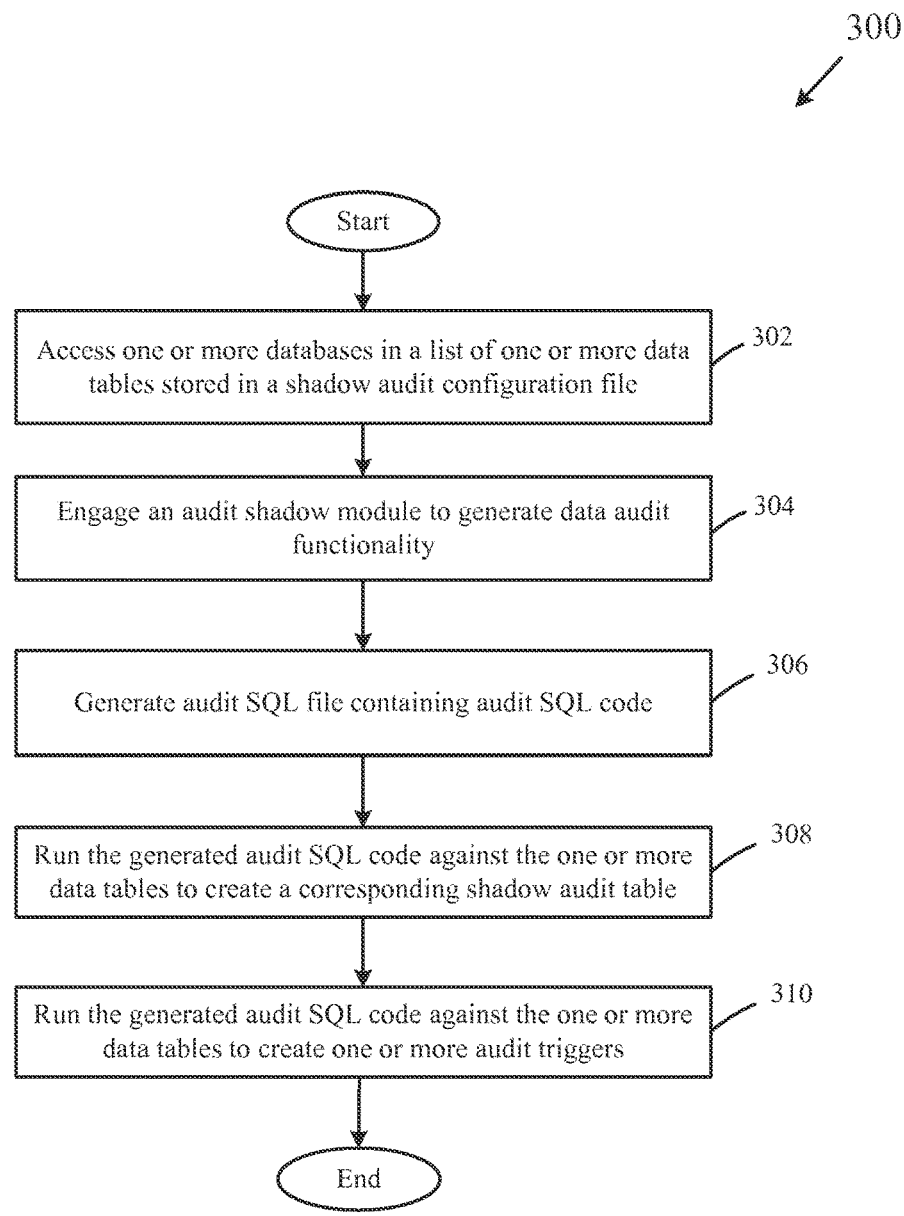
FIG. 3 illustrates a flow chart of an example method for generating data auditing functionality for one or more databases associated with an application, according to an example embodiment.

FIG. 3 is a flow chart illustrating an example method 300 for generating data auditing functionality for one or more databases associated with an application, according to an example embodiment of the disclosure. Referring now to FIGS. 1-3 the exemplary method 300 begins at the START step and continues to step 302, where a user may access a shadow audit configuration file. In one example, the shadow audit configuration file may include, without limitation, one or more main data tables 128(1)-(N). For example, an application, such as enterprise application 126, may require auditing functionality for tracking edits made to account permissions. If the permissions are stored in data table 128(1) and 128(2), these two data tables may be listed in the shadow audit configuration file.

At step 304, an authenticated user may engage a shadow audit module 106 to generate data audit functionality for one or more databases stored in the shadow audit configuration file. In one example, the authenticated user may engage the shadow audit module 106 to automate and optimize the implementation of the data auditing functionality for the multiple database platforms associated with an application. For example, once engaged, the shadow audit module 106 may be automatically run by the database management computer system 104 based on predetermined criteria. In one example, the one or more predetermined criteria may include, but are not limited to, a set time, an amount of data change, a count of user interactions, or the like. In one example, the shadow audit module 106 may employ existing programming (C#, C++, Python, JAVA, C, PHP, or the like) and structured query language (SQL). For example, the shadow audit module 106 may include programming such as:

```
class OracleAudit extends AbstractAudit {
    private class Column implements Comparable<Column>
    {
        public int seq;
        public String name;
        public String ddlType;
        public Column(int seq, String name, String ddlType)
        {
            this.seq=seq;
            this.name=name;
            this.ddlType=ddlType;
        }
        @Override
        public int compareTo(Column that) {
            if (seq<that.seq)
                return -1;
            if (seq>that.seq)
                return 1;
            return 0;
        }
    }
}
```

At step 306, the shadow audit module 106 may generate an audit SQL code file, such as audit SQL code file 146. In one example, the audit SQL code file 146 may contain programming (e.g., SQL) used in the initial and/or continuing auditing of the one or more data tables 128(1) and 128(2) (e.g., creating shadow audit data tables, audit triggers and the like). The audit SQL code file 146 may be generated by analyzing the one or more databases associated with the enterprise application 126. For example, the shadow audit module 106 may analyze the structures of the one or more main data tables 128(1) and 128(2) corresponding to the databases 108(1) and 108(2), respectively, to generate the audit SQL code file 146. It should be appreciated that, based upon the analysis of the structures of the one or more main data tables 128(1) and 128(2), the same audit SQL code file or a different audit SQL code file may be generated for each database platform, for example, database 108(1) and 108(2). By way of example only, the SQL code file 146 may be illustrated in the following sample output, Sample Output 1, to be used to generate one or more shadow audit data tables and/or one or more audit triggers.

Sample Output 1
 Audit Sequence
CREATE SEQUENCE AUDIT_SEQ START WITH 1 INCREMENT BY 1;
 Audit Support for table APP

```
CREATE TABLE APP_S (
    A_ID NUMBER,
    A_OP CHAR(1),
    A_DT TIMESTAMP WITH TIME ZONE NOT NULL,
    A_USER VARCHAR2(30),
    APP_ID NUMBER,
    APP_NM VARCHAR2(20),
    APP_PASSWD VARCHAR2(20),
    START_DT TIMESTAMP(6) WITH TIME ZONE,
    END_DT TIMESTAMP(6) WITH TIME ZONE,
    STATUS_ID NUMBER,
    CREATED_DT TIMESTAMP(6) WITH TIME ZONE,
```

```
        CREATED_BY NUMBER,
        UPDATED_DT TIMESTAMP(6) WITH TIME ZONE,
        UPDATED_BY NUMBER
    );
    CREATE OR REPLACE TRIGGER A_TRG_APP
    AFTER UPDATE OR DELETE ON APP
    FOR EACH ROW
    DECLARE
        NOW DATE;
        OP CHAR;
    BEGIN
        NOW := SYSDATE;
        IF DELETING THEN
            OP := 'D';
        ELSE
            IF UPDATING('APP_ID') THEN
                OP := 'X';
            ELSE
                OP := 'U';
            END IF;
        END IF;
        INSERT INTO APP_S (A_ID, A_OP, A_DT, A_USER,
            APP_ID, APP_NM,
    APP_PASSWD, START_DT, END_DT, STATUS_ID,
    CREATED_DT, CREATED_BY,
    UPDATED_DT, UPDATED_BY)
            VALUES (AUDIT_SEQ.NEXTVAL, OP, NOW, USER,
            :OLD.APP_ID, :OLD.APP_NM, :OLD.APP_PASSWD,
            :OLD.START_DT,
    :OLD.END_DT, :OLD.STATUS_ID, :OLD.CREATED_DT,
    :OLD.CREATED_BY,
    :OLD.UPDATED_DT, :OLD.UPDATED_BY);
        END;
    /
```

Audit Support for table APP_X_NOTIF

```
CREATE TABLE APP_X_NOTIF_S (
    A_ID NUMBER,
    A_OP CHAR(1),
    A_DT TIMESTAMP WITH TIME ZONE NOT NULL,
    A_USER VARCHAR2(30),
    APP_X_NOTIF_ID NUMBER,
    APP_ID NUMBER,
    NOTIF_TYPE_ID NUMBER,
    EMAIL_IND CHAR(1),
    EMAIL_SUBJECT VARCHAR2(50),
    EMAIL_HTML CLOB,
    FROM_ADDR VARCHAR2(50),
    FROM_NM VARCHAR2(50),
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_APP_X_NOTIF
AFTER UPDATE OR DELETE ON APP_X_NOTIF
FOR EACH ROW
DECLARE
    NOW DATE;
    OP CHAR;
BEGIN
    NOW := SYSDATE;
    IF DELETING THEN
        OP := 'D';
    ELSE
        IF UPDATING('APP_X_NOTIF_ID') THEN
            OP := 'X';
        ELSE
            OP := 'U';
        END IF;
    END IF;
    INSERT INTO APP_X_NOTIF_S (A_ID, A_OP, A_DT,
        A_USER,
APP_X_NOTIF_ID, APP_ID, NOTIF_TYPE_ID, EMAIL_IND,
EMAIL_SUBJECT,EMAIL_HTML, FROM_ADDR, FROM_NM,
CREATED_DT,
CREATED_BY, UPDATED_DT, UPDATED_BY)
VALUES (AUDIT_SEQ.NEXTVAL, OP, NOW, USER,
    :OLD.APP_X_NOTIF_ID, :OLD.APP_ID,
    :OLD.NOTIF_TYPE_ID,
:OLD.EMAIL_IND, :OLD.EMAIL_SUBJECT, :OLD.EMAIL_HTML,
:OLD.FROM_ADDR, :OLD.FROM_NM, :OLD.CREATED_DT,
:OLD.CREATED_BY,
:OLD.UPDATED_DT, :OLD.UPDATED_BY);
END;
/
```

Audit Support for table ORG

```
CREATE TABLE ORG_S (
    A_ID NUMBER,
    A_OP CHAR(1),
    A_DT TIMESTAMP WITH TIME ZONE NOT NULL,
    A_USER VARCHAR2(30),
    ORG_ID NUMBER,
    ORG_NM VARCHAR2(50),
    PARENT_ORG_ID NUMBER,
    MBOX_ID NUMBER,
    EMAIL VARCHAR2(50),
    STATUS_ID NUMBER,
    EMR_ID NUMBER,
    EMR_ORG_ID VARCHAR2(100),
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_ORG
AFTER UPDATE OR DELETE ON ORG
FOR EACH ROW
DECLARE
    NOW DATE;
    OP CHAR;
BEGIN
    NOW := SYSDATE;
    IF DELETING THEN
        OP := 'D';
    ELSE
        IF UPDATING('ORG_ID') THEN
            OP := 'X';
        ELSE
            OP := 'U';
        END IF;
    END IF;
    INSERT INTO ORG_S (A_ID, A_OP, A_DT, A_USER,
        ORG_ID, ORG_NM,
PARENT_ORG_ID, MBOX_ID, EMAIL, STATUS_ID, EMR_ID,
EMR_ORG_ID,
CREATED_DT, CREATED_BY, UPDATED_DT, UPDATED_BY)
    VALUES (AUDIT_SEQ.NEXTVAL, OP, NOW, USER,
    :OLD.ORG_ID, :OLD.ORG_NM, :OLD.PARENT_ORG_ID,
    :OLD.MBOX_ID,
:OLD.EMAIL, :OLD.STATUS_ID, :OLD.EMR_ID,
:OLD.EMR_ORG_ID,
:OLD.CREATED_DT, :OLD.CREATED_BY, :OLD.UPDATED_DT,
:OLD.UPDATED_BY);
END;
/
```

Audit Support for table PRAC_ROLE

```
CREATE TABLE PRAC_ROLE_S (
    A_ID NUMBER,
    A_OP CHAR(1),
    A_DT TIMESTAMP WITH TIME ZONE NOT NULL,
    A_USER VARCHAR2(30),
    PRAC_ROLE_ID NUMBER,
    PRAC_ROLE_NM VARCHAR2(20),
    ORG_ID NUMBER,
    STATUS_ID NUMBER,
    CREATED_DT TIMESTAMP(6) WITH TIME ZONE,
```

```
    CREATED_BY NUMBER,
    UPDATED_DT TIMESTAMP(6) WITH TIME ZONE,
    UPDATED_BY NUMBER
);
CREATE OR REPLACE TRIGGER A_TRG_PRAC_ROLE
AFTER UPDATE OR DELETE ON PRAC_ROLE
FOR EACH ROW
DECLARE
    NOW DATE;
    OP CHAR;
BEGIN
    NOW := SYSDATE;
    IF DELETING THEN
        OP := 'D';
    ELSE
        IF UPDATING('PRAC_ROLE_ID') THEN
            OP := 'X';
        ELSE
            OP := 'U';
        END IF;
    END IF;
    INSERT INTO PRAC_ROLE_S (A_ID, A_OP, A_DT,
        A_USER, PRAC_ROLE_ID,
PRAC_ROLE_NM, ORG_ID, STATUS_ID, CREATED_DT,
CREATED_BY,
UPDATED_DT, UPDATED_BY)
    VALUES (AUDIT_SEQ.NEXTVAL, OP, NOW, USER,
        :OLD.PRAC_ROLE_ID, :OLD.PRAC_ROLE_NM,
        :OLD.ORG_ID,
:OLD.STATUS_ID, :OLD.CREATED_DT, :OLD.CREATED_BY,
:OLD.UPDATED_DT,
:OLD.UPDATED_BY);
END;
/
```

Audit Support for table MSG_TYPE

```
CREATE TABLE MSG_TYPE_S (
    A_ID NUMBER,
    A_OP CHAR(1),
    A_DT TIMESTAMP WITH TIME ZONE NOT NULL,
    A_USER VARCHAR2(30),
    MSG_TYPE_ID NUMBER,
    MSG_TYPE_NM VARCHAR2(50),
    ORG_ID NUMBER,
    STATUS_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_MSG_TYPE
AFTER UPDATE OR DELETE ON MSG_TYPE
FOR EACH ROW
DECLARE
    NOW DATE;
    OP CHAR;
BEGIN
    NOW := SYSDATE;
    IF DELETING THEN
        OP := 'D';
    ELSE
        IF UPDATING('MSG_TYPE_ID') THEN
            OP := 'X';
        ELSE
            OP := 'U';
        END IF;
    END IF;
    INSERT INTO MSG_TYPE_S (A_ID, A_OP, A_DT,
        A_USER, MSG_TYPE_ID,
MSG_TYPE_NM, ORG_ID, STATUS_ID, CREATED_DT,
CREATED_BY,
UPDATED_DT, UPDATED_BY)
    VALUES (AUDIT_SEQ.NEXTVAL, OP, NOW, USER,
        :OLD.MSG_TYPE_ID, :OLD.MSG_TYPE_NM, :OLD.ORG_ID,
        :OLD.STATUS_ID,
:OLD.CREATED_DT, :OLD.CREATED_BY, :OLD.UPDATED_DT,
:OLD.UPDATED_BY);
END;
/
```

Audit Support for table ORG_X_MSG_TYPE

```
CREATE TABLE ORG_X_MSG_TYPE_S (
    A_ID NUMBER,
    A_OP CHAR(1),
    A_DT TIMESTAMP WITH TIME ZONE NOT NULL,
    A_USER VARCHAR2(30),
    ORG_ID NUMBER,
    MSG_TYPE_ID NUMBER,
    TMPLT_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_ORG_X_MSG_TYPE
AFTER UPDATE OR DELETE ON ORG_X_MSG_TYPE
FOR EACH ROW
DECLARE
    NOW DATE;
    OP CHAR;
BEGIN
    NOW := SYSDATE;
    IF DELETING THEN
        OP := 'D';
    ELSE
        IF UPDATING('MSG_TYPE_ID') OR
            UPDATING('ORG_ID') THEN
            OP := 'X';
        ELSE
            OP := 'U';
        END IF;
    END IF;
    INSERT INTO ORG_X_MSG_TYPE_S (A_ID, A_OP, A_DT,
        A_USER, ORG_ID,
MSG_TYPE_ID, TMPLT_ID, CREATED_DT, CREATED_BY,
UPDATED_DT,
UPDATED_BY)
    VALUES (AUDIT_SEQ.NEXTVAL, OP, NOW, USER,
        :OLD.ORG_ID, :OLD.MSG_TYPE_ID, :OLD.TMPLT_ID,
        :OLD.CREATED_DT,
:OLD.CREATED_BY, :OLD.UPDATED_DT, :OLD.UPDATED_BY);
END;
/
```

Audit Support for table MSG_TMPLT

```
CREATE TABLE MSG_TMPLT_S (
    A_ID NUMBER,
    A_OP CHAR(1),
    A_DT TIMESTAMP WITH TIME ZONE NOT NULL,
    A_USER VARCHAR2(30),
    TMPLT_ID NUMBER,
    TMPLT_NM VARCHAR2(50),
    TMPLT_SUBJECT VARCHAR2(50),
    TMPLT_CONTENT CLOB,
    ORG_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_MSG_TMPLT
AFTER UPDATE OR DELETE ON MSG_TMPLT
FOR EACH ROW
DECLARE
    NOW DATE;
    OP CHAR;
BEGIN
    NOW := SYSDATE;
    IF DELETING THEN
```

```
        OP := 'D';
    ELSE
        IF UPDATING('TMPLT_ID') THEN
            OP := 'X';
        ELSE
            OP := 'U';
        END IF;
    END IF;
    INSERT INTO MSG_TMPLT_S (A_ID, A_OP, A_DT,
        A_USER, TMPLT_ID,
TMPLT_NM, TMPLT_SUBJECT, TMPLT_CONTENT, ORG_ID,
CREATED_DT,
CREATED_BY, UPDATED_DT, UPDATED_BY)
    VALUES (AUDIT_SEQ.NEXTVAL, OP, NOW, USER,
        :OLD.TMPLT_ID, :OLD.TMPLT_NM, :OLD.TMPLT_SUBJECT,
:OLD.TMPLT_CONTENT, :OLD.ORG_ID, :OLD.CREATED_DT,
:OLD.CREATED_BY,
:OLD.UPDATED_DT, :OLD.UPDATED_BY);
END;
/
```

Audit Support for table MSG_TMPLT_ATTR

```
CREATE TABLE MSG_TMPLT_ATTR_S (
    A_ID NUMBER,
    A_OP CHAR(1),
    A_DT TIMESTAMP WITH TIME ZONE NOT NULL,
    A_USER VARCHAR2(30),
    TMPLT_ATTR_ID NUMBER,
    TMPLT_ID NUMBER,
    ATTR_NM VARCHAR2(50),
    ATTR_VAL CLOB,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_MSG_TMPLT_ATTR
AFTER UPDATE OR DELETE ON MSG_TMPLT_ATTR
FOR EACH ROW
DECLARE
    NOW DATE;
    OP CHAR;
BEGIN
    NOW := SYSDATE;
    IF DELETING THEN
        OP := 'D';
    ELSE
        IF UPDATING('TMPLT_ATTR_ID') THEN
            OP := 'X';
        ELSE
            OP := 'U';
        END IF;
    END IF;
    INSERT INTO MSG_TMPLT_ATTR_S (A_ID, A_OP,
        A_DT, A_USER,
TMPLT_ATTR_ID, TMPLT_ID, ATTR_NM, ATTR_VAL,
CREATED_DT,
CREATED_BY, UPDATED_DT, UPDATED_BY)
    VALUES (AUDIT_SEQ.NEXTVAL, OP, NOW, USER,
        :OLD.TMPLT_ATTR_ID, :OLD.TMPLT_ID, :OLD.ATTR_NM,
        :OLD.ATTR_VAL,
:OLD.CREATED_DT, :OLD.CREATED_BY, :OLD.UPDATED_DT,
:OLD.UPDATED_BY);
END;
/
```

Audit Support for table USERS

```
CREATE TABLE USERS_S (
    A_ID NUMBER,
    A_OP CHAR(1),
    A_DT TIMESTAMP WITH TIME ZONE NOT NULL,
    A_USER VARCHAR2(30),
    USER_ID NUMBER,
    FIRST_NM VARCHAR2(30),
    MIDDLE_NM VARCHAR2(30),
    LAST_NM VARCHAR2(30),
    EMAIL VARCHAR2(50),
    USER_TYPE_ID NUMBER,
    MBOX_ID NUMBER,
    STATUS_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_USERS
AFTER UPDATE OR DELETE ON USERS
FOR EACH ROW
DECLARE
    NOW DATE;
    OP CHAR;
BEGIN
    NOW := SYSDATE;
    IF DELETING THEN
        OP := 'D';
    ELSE
        IF UPDATING('USER_ID') THEN
            OP := 'X';
        ELSE
            OP := 'U';
        END IF;
    END IF;
    INSERT INTO USERS_S (A_ID, A_OP, A_DT, A_USER,
        USER_ID, FIRST_NM,
MIDDLE_NM, LAST_NM, EMAIL, USER_TYPE_ID, MBOX_ID,
STATUS_ID,
CREATED_DT, CREATED_BY, UPDATED_DT, UPDATED_BY)
    VALUES (AUDIT_SEQ.NEXTVAL, OP, NOW, USER,
        :OLD.USER_ID, :OLD.FIRST_NM, :OLD.MIDDLE_NM,
        :OLD.LAST_NM,
:OLD.EMAIL, :OLD.USER_TYPE_ID, :OLD.MBOX_ID,
:OLD.STATUS_ID,
:OLD.CREATED_DT, :OLD.CREATED_BY, :OLD.UPDATED_DT,
:OLD.UPDATED_BY);
END;
/
```

Audit Support for table USER_X_ORG_X_ROLE

```
CREATE TABLE USER_X_ORG_X_ROLE_S (
    A_ID NUMBER,
    A_OP CHAR(1),
    A_DT TIMESTAMP WITH TIME ZONE NOT NULL,
    A_USER VARCHAR2(30),
    USER_X_ORG_X_ROLE_ID NUMBER,
    USER_ID NUMBER,
    ORG_ID NUMBER,
    PRAC_ROLE_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER
A_TRG_USER_X_ORG_X_ROLE
AFTER UPDATE OR DELETE ON USER_X_ORG_X_ROLE
FOR EACH ROW
DECLARE
    NOW DATE;
    OP CHAR;
BEGIN
    NOW := SYSDATE;
    IF DELETING THEN
        OP := 'D';
    ELSE
        IF UPDATING('USER_X_ORG_X_ROLE_ID') THEN
            OP := 'X';
        ELSE
            OP := 'U';
        END IF;
```

```
        END IF;
        INSERT INTO USER_X_ORG_X_ROLE_S (A_ID, A_OP,
    A_DT, A_USER,
USER_X_ORG_X_ROLE_ID, USER_ID, ORG_ID,
PRAC_ROLE_ID, CREATED_DT,
CREATED_BY, UPDATED_DT, UPDATED_BY)
        VALUES (AUDIT_SEQ.NEXTVAL, OP, NOW, USER,
            :OLD.USER_X_ORG_X_ROLE_ID, :OLD.USER_ID,
            :OLD.ORG_ID,
:OLD.PRAC_ROLE_ID, :OLD.CREATED_DT,
:OLD.CREATED_BY,
:OLD.UPDATED_DT, :OLD.UPDATED_BY);
END;
/
```

Audit Support for table UDATA

```
CREATE TABLE UDATA_S (
    A_ID NUMBER,
    A_OP CHAR(1),
    A_DT TIMESTAMP WITH TIME ZONE NOT NULL,
    A_USER VARCHAR2(30),
    USER_ID NUMBER,
    UDATA_TYPE_ID NUMBER,
    UDATA_VAL VARCHAR2(4000),
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_UDATA
AFTER UPDATE OR DELETE ON UDATA
FOR EACH ROW
DECLARE
    NOW DATE;
    OP CHAR;
BEGIN
    NOW := SYSDATE;
    IF DELETING THEN
        OP := 'D';
    ELSE
        IF UPDATING('UDATA_TYPE_ID') OR
        UPDATING('USER_ID') THEN
            OP := 'X';
        ELSE
            OP := 'U';
        END IF;
    END IF;
    INSERT INTO UDATA_S (A_ID, A_OP, A_DT, A_USER,
        USER_ID,
UDATA_TYPE_ID, UDATA_VAL, CREATED_DT, CREATED_BY,
UPDATED_DT,
UPDATED_BY)
        VALUES (AUDIT_SEQ.NEXTVAL, OP, NOW, USER,
            :OLD.USER_ID, :OLD.UDATA_TYPE_ID,
            :OLD.UDATA_VAL,
:OLD.CREATED_DT, :OLD.CREATED_BY, :OLD.UPDATED_DT,
:OLD.UPDATED_BY);
END;
/
```

Audit Support for table MBOX_PERM

```
CREATE TABLE MBOX_PERM_S (
    A_ID NUMBER,
    A_OP CHAR(1),
    A_DT TIMESTAMP WITH TIME ZONE NOT NULL,
    A_USER VARCHAR2(30),
    MBOX_PERM_ID NUMBER,
    MBOX_ID NUMBER,
    ACTOR_ID NUMBER,
    USER_ACTOR_IND CHAR(1),
    RW_IND CHAR(1),
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_MBOX_PERM
AFTER UPDATE OR DELETE ON MBOX_PERM
FOR EACH ROW
DECLARE
    NOW DATE;
    OP CHAR;
BEGIN
    NOW := SYSDATE;
    IF DELETING THEN
        OP := 'D';
    ELSE
        IF UPDATING('MBOX_PERM_ID') THEN
            OP := 'X';
        ELSE
            OP := 'U';
        END IF;
    END IF;
    INSERT INTO MBOX_PERM_S (A_ID, A_OP, A_DT,
        A_USER,
MBOX_PERM_ID, MBOX_ID, ACTOR_ID, USER_ACTOR_IND,
RW_IND,
CREATED_DT, CREATED_BY, UPDATED_DT, UPDATED_BY)
        VALUES (AUDIT_SEQ.NEXTVAL, OP, NOW, USER,
            :OLD.MBOX_PERM_ID, :OLD.MBOX_ID,
            :OLD.ACTOR_ID,
:OLD.USER_ACTOR_IND, :OLD.RW_IND, :OLD.CREATED_DT,
:OLD.CREATED_BY, :OLD.UPDATED_DT, :OLD.UPDATED_BY);
END;
/
```

Audit Support for table MBOX_ACL

```
CREATE TABLE MBOX_ACL_S (
    A_ID NUMBER,
    A_OP CHAR(1),
    A_DT TIMESTAMP WITH TIME ZONE NOT NULL,
    A_USER VARCHAR2(30),
    MBOX_ACL_ID NUMBER,
    MBOX_ID NUMBER,
    MSG_ACTION_ID NUMBER,
    ACTOR_ID NUMBER,
    USER_ACTOR_IND CHAR(1),
    MSG_TYPE_ID NUMBER,
    CREATED_DT TIMESTAMP(6) WITH TIME ZONE,
    CREATED_BY NUMBER,
    UPDATED_DT TIMESTAMP(6) WITH TIME ZONE,
    UPDATED_BY NUMBER
);
CREATE OR REPLACE TRIGGER A_TRG_MBOX_ACL
AFTER UPDATE OR DELETE ON MBOX_ACL
FOR EACH ROW
DECLARE
    NOW DATE;
    OP CHAR;
BEGIN
    NOW := SYSDATE;
    IF DELETING THEN
        OP := 'D';
    ELSE
        IF UPDATING('MBOX_ACL_ID') THEN
            OP := 'X';
        ELSE
            OP := 'U';
        END IF;
    END IF;
    INSERT INTO MBOX_ACL_S (A_ID, A_OP, A_DT, A_USER,
        MBOX_ACL_ID,
MBOX_ID, MSG_ACTION_ID, ACTOR_ID, USER_ACTOR_IND,
MSG_TYPE_ID,
CREATED_DT, CREATED_BY, UPDATED_DT, UPDATED_BY)
        VALUES (AUDIT_SEQ.NEXTVAL, OP, NOW, USER,
            :OLD.MBOX_ACL_ID, :OLD.MBOX_ID,
            :OLD.MSG_ACTION_ID,
:OLD.ACTOR_ID, :OLD.USER_ACTOR_IND,
```

```
:OLD.MSG_TYPE_ID,
:OLD.CREATED_DT, :OLD.CREATED_BY,
:OLD.UPDATED_DT,
:OLD.UPDATED_BY);
END;
/
/* DROP Statements
DROP SEQUENCE AUDIT_SEQ;
DROP TRIGGER A_TRG_APP;
DROP TRIGGER A_TRG_APP_X_NOTIF;
DROP TRIGGER A_TRG_ORG;
DROP TRIGGER A_TRG_PRAC_ROLE;
DROP TRIGGER A_TRG_MSG_TYPE;
DROP TRIGGER A_TRG_ORG_X_MSG_TYPE;
DROP TRIGGER A_TRG_MSG_TMPLT;
DROP TRIGGER A_TRG_MSG_TMPLT_ATTR;
DROP TRIGGER A_TRG_USERS;
DROP TRIGGER A_TRG_USER_X_ORG_X_ROLE;
DROP TRIGGER A_TRG_UDATA;
DROP TRIGGER A_TRG_MBOX_PERM;
DROP TRIGGER A_TRG_MBOX_ACL;
DROP TABLE APP_S;
DROP TABLE APP_X_NOTIF_S;
DROP TABLE ORG_S;
DROP TABLE PRAC_ROLE_S;
DROP TABLE MSG_TYPE_S;
DROP TABLE ORG_X_MSG_TYPE_S;
DROP TABLE MSG_TMPLT_S;
DROP TABLE MSG_TMPLT_ATTR_S;
DROP TABLE USERS_S;
DROP TABLE USER_X_ORG_X_ROLE_S;
DROP TABLE UDATA_S;
DROP TABLE MBOX_PERM_S;
DROP TABLE MBOX_ACL_S;
*/
```

At step 308, the shadow audit module 106 may run the generated audit SQL code 146 against the one or more data tables 128(1) and 128(2) to create a corresponding shadow audit data table 148. In one example, the shadow audit data table 148 may include, without limitation, a replica of all the columns of a corresponding main data table 128 as well as one or more additional columns to store metadata corresponding to one or more data modifications that have been made to the main data table 128. In one example, embodiment, the main data table 128 contains the latest version of the data record while the shadow audit data table 148 contains the history of all modifications made to that data record. The data modifications, may include, for example, a deletion of one or more data records, an update of one or more data records, creation of one or more data records, or the like. The metadata may also capture user information for the user or system that performed the action on the main table, and/or the date/time the action happened. For example, the shadow audit data table 148 may be a replication of an exemplary Main Table 1.

Main Table 1

| Field Name | Description |
| --- | --- |
| CustomerId | Incremental identify value |
| Customer Name | Name of customer |
| Customer Address | Customer address |

Shadow Audit Data Table 132

| Field Name | Description |
| --- | --- |
| CustomerId | Incremental identify value |
| Customer Name | Name of customer |
| Customer Address | Customer address |

| Field Name | Description |
| --- | --- |
| Historical CustomerId 1 | Incremental identify value |
| Historical Customer Name 1 | Name of customer |
| Historical Customer Address 1 | Customer address |
| Username | Metadata |
| Date/time of change | Metadata |

At step 310, the shadow audit module 106 may further run the generated audit SQL code file 146 to create one or more audit triggers 502 in the one or more selected main data tables, such as the selected main table 128 as shown in FIG. 5. Placement of the one or more audit triggers 502A, 502B in a selected main data table 128 enables all data modifications made to the selected main table 128 to be tracked by a corresponding shadow audit data table 148. For example, shadow audit module 106 may create a new column 504 in the one or more selected main data tables, such as the selected main table 128 and an audit trigger 502A 502B, which may be a procedure, and/or a flag 502A 502B, may be stored in one or all of the records of a selected main data table 128 to run or transmit a signal indicating a change that may have occurred on the record indicating the required replication of the modification in the shadow audit data table 148. The audit trigger 502A 502B may run when the change (e.g., insert, update, and/or a deletion) occurs on the selected main data table 128. For example, an audit trigger 502A 502B may be generated to run on an exemplary Main Table 1.

Main Table 1

| Field Name | Description |
| --- | --- |
| CustomerId | Incremental identify value |
| Customer Name | Name of customer |
| Customer Address | Customer address |
| Trigger | Audit trigger |

Anytime a change (e.g., an insertion, a deletion, or an update) occurs to one or more records in the Main Table 1, the audit trigger may run. If the audit trigger runs indicating a change to one or more records in the Main Table 1 (e.g., the Customer Name changed), a replica of the change may be created in a corresponding one or more records in shadow audit data table 148 the shadow audit module 146 The shadow audit data table 148 may include a history of all data modifications that have been made to the corresponding main table (e.g, Main Table 1).

The method 300 may end after step 310.

Figure 4:
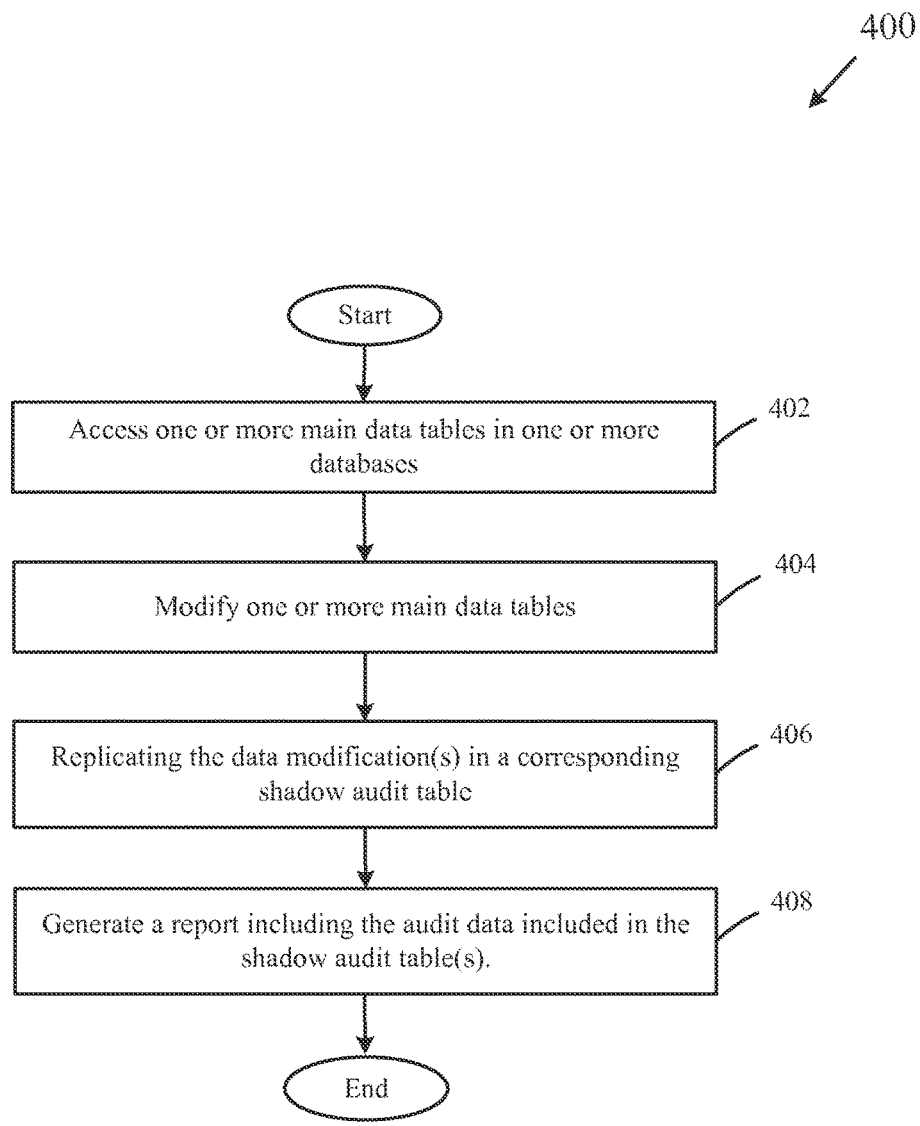
FIG. 4 illustrates a flow chart of an example method for implementing the data audit functionality and tracking and/or reporting data modifications, according to an example embodiment.

FIG. 4 is a flow chart illustrating an example method 400 for implementing the data audit functionality and tracking and/or reporting data modifications, according to an example embodiment of the disclosure. Referring now to FIGS. 1, 3, and 4, the exemplary method 400 begins at the START step and continues to step 402, where a user may access one or more main data tables 128(1)-(N) in one or more databases 108(1)-(N) via, for example, the enterprise application 126. In one example, the user may be any application user and may not user rights for shadow audit module 106.

At step 404, the user may utilize the enterprise application 126 to make one or more modifications to the accessed data table(s) 128(1)-(N). For example, the user may insert data into an existing record of main data table 128(1), create a new record in main data table 128(1) or delete a record from main data table 128(1). If the main data table 128(1) includes an audit trigger, at step 406 the data modification(s) may be replicated in a corresponding shadow audit data table 148 (see FIG. 3 for detail). If, however, the main data table does not include an audit trigger, the data modification may not be tracked by the shadow audit module 106.

At step 408, the shadow audit module 106 may generate a report including, without limitation, the audit data included in the shadow audit data table(s) 148. The report may include, without limitations, the data record modification(s) that were made in the main data table(s) 128(1)-(N), an identification of the user requesting the modification, and/or the date/time the modification was made. The method may end after step 408.

Accordingly, example embodiments disclosed herein can provide the technical effects of creating systems and methods that provide a way to generate and implement data auditing functionality across multiple database platforms. While the exemplary embodiments described herein disclose certain steps occurring at the shadow audit module 106, in alternative embodiments those steps described with reference to FIGS. 1-4 may alternately be completed at the computer system 102, a processor driven device separate and distinct from the computer system 102 and/or any combination of those devices. In those alternate embodiments, certain steps described above with reference to FIGS. 1-4 may be omitted while others may be added, as understood by one of ordinary skill in the art. The intent being that in alternate embodiments, any of the devices/computers discussed in FIG. 1 are capable of completing any or any part of the methods described with reference to FIGS. 2-4.

Various block and/or flow diagrams of systems and methods and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, that includes a computer usable medium (e.g., transitory or non-transitory) having a computer-readable program code or program instructions embodied therein, said computer-readable program code adapted to be executed to implement one or more functions specified in the flow diagram step or steps. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram step or steps.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of those set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method to automate and optimize implementation of data auditing functionality for multiple database platforms, comprising:

accessing, by one or more computers comprising one or more processors, a shadow audit configuration file comprising a list of one or more first data tables in a first database to be audited and a list of one or more second data tables in a second database to be audited, wherein the first database is a first database platform and the second database is a second database platform;

generating, by the one or more computers comprising one or more processors, a first audit file comprising first audit code;

running, by the one or more computers, the generated first audit code against a first data table in the one or more first data tables in the first database to create a first shadow audit data table;

running, by the one or more computers, the generated first audit code to create one or more first audit triggers;

inserting, by the one or more computers, the one or more first audit triggers in the first data table, wherein at least one of the one or more first audit triggers is configured to run when a data modification is made to the first data table;

replicating, by the one or more computers, the data modification in the first shadow audit data table;

generating, by the one or more computers, a second audit file comprising second audit code;

running, by the one or more computers, the generated second audit code against a second data table in the one or more second data tables in the second database to create a second shadow audit data table;

running, by the one or more computers, the generated second audit code to create one or more second audit triggers that are inserted in the second data table and wherein at least one of the one or more audit triggers is configured to run when a data modification is made to the second data table; and replicating, by the one or more computers, the data modification in the second shadow audit data table when the data modification is made to the second data table and an audit trigger of the one or more second audit triggers has run.

2. The computer-implemented method of claim 1 further comprising:
reporting, by the one or more computers, one or more data modifications that were made to the first data table.

3. The computer-implemented method of claim 1, wherein the first shadow audit data table comprises at least data of the first data table and metadata corresponding to the data modification to the first data table.

4. The computer-implemented method of claim 3, wherein the data modification to the first data table comprises at least one of a deletion, an insertion, or an update, and wherein the metadata further comprises information for the user making the data modification to the first data table, or a date or time the data modification to the first data table was made.

5. The computer-implemented method of claim 1, wherein generating the first audit file is engaged by an authenticated user.

6. The computer-implemented method of claim 1, wherein the first data table contains a latest version of a data record.

7. The computer-implemented method of claim 1, wherein the first shadow audit data table includes at least a history of all data modifications that have been made to the first data table.

8. The method of claim 1, wherein the first audit code comprises structured query language (SQL) code.

9. The method of claim 1, wherein the one or more first audit triggers comprise one or more flags.

10. The method of claim 1, wherein the one or more first audit triggers comprise one or more procedures.

11. A system to automate and optimize implementation of data auditing functionality for multiple database platforms comprising:
at least one memory storing computer-executable instructions; and
at least one processor configured to access the at least one memory and execute the computer-executable instructions to:
access a shadow audit configuration file comprising a list of one or more first data tables in a first database to be audited and a list of one or more second data tables in a second database to be audited, wherein the first database is a first database platform and the second database is a second database platform;
run a shadow audit module against the first database corresponding to an application to determine a first data table in the one or more first data tables in the first database that needs to be audited;
generate first audit code;
run the generated first audit code against the first data table in the first database to create a first shadow audit data table;
run the generated first audit code to create one or more first audit triggers;
insert the one or more first audit triggers in the first data table, wherein at least one of the one or more first audit triggers is configured to run when a data modification is made to the first data table;
replicate the data modification in the first shadow audit data table,
generate second audit code;
run the generated second audit code against a second data table in the one or more second data tables in the second database to create a second shadow audit data table;
run the generated second audit code to create one or more second audit triggers;
insert the one or more second audit triggers in the second data table; wherein at least one of the one or more audit triggers is configured to run when a data modification is made to the second data table; and
replicate the data modification in the second shadow audit data table when the data modification is made to the second data table and an audit trigger of the one or more second audit triggers has run.

12. The system of claim 11 wherein the at least one or more processors configured are further configured to execute the computer-executable instructions to:
report one or more data modifications that were made to the first data table.

13. The system of claim 11, wherein the first shadow audit data table comprises at least data of the first data table and metadata corresponding to the data modification to the first data table.

14. The system of claim 13, wherein the data modification to the first data table comprises at least one of a deletion, an insertion, or an update, and wherein the metadata further comprises information for the user making the data modification to the first data table, or a date or time the data modification to the first data table was made.

15. The system of claim 11, wherein the shadow audit module is engaged by an authenticated user.

16. The system of claim 11, wherein the first data table contains a latest version of a data record.

17. The system of claim 11, wherein the first shadow audit data table includes at least a history of all data modifications that have been made to the first data table.

18. The system of claim 11, wherein the first audit code comprises structured query language (SQL) code.

19. The system of claim 11, wherein the one or more first audit triggers comprise one or more flags.

20. The system of claim 11, wherein the one or more first audit triggers comprise one or more procedures.

* * * * *